(12) United States Patent
Rosu et al.

(10) Patent No.: US 8,719,796 B2
(45) Date of Patent: May 6, 2014

(54) PARAMETRIC TRACE SLICING

(75) Inventors: Grigore Rosu, Champaign, IL (US);
 Feng Chen, Urbana, IL (US); Guo-fang Chen, legal representative, Fuzhou (CN);
 Yamei Wu, legal representative, Fuzhou (CN); Patrick O. Meredith, Granite City, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 450 days.

(21) Appl. No.: 13/012,133

(22) Filed: Jan. 24, 2011

(65) Prior Publication Data

US 2011/0320878 A1 Dec. 29, 2011

Related U.S. Application Data

(60) Provisional application No. 61/298,303, filed on Jan. 26, 2010.

(51) Int. Cl.
 *G06F 9/44* (2006.01)

(52) U.S. Cl.
 USPC .......................... 717/128; 717/130; 717/131

(58) Field of Classification Search
 None
 See application file for complete search history.

(56) References Cited

U.S. PATENT DOCUMENTS

| | | | | |
|---|---|---|---|---|
| 7,441,234 B2* | 10/2008 | Cwalina et al. | ................ | 717/128 |
| 7,536,602 B2* | 5/2009 | Dams | ............................ | 717/131 |
| RE41,228 E* | 4/2010 | Kodosky et al. | ............... | 717/130 |
| 7,926,043 B2* | 4/2011 | Vaswani et al. | ................ | 717/130 |
| 7,926,044 B2* | 4/2011 | Iley et al. | ....................... | 717/131 |
| 8,176,475 B2* | 5/2012 | Kosche et al. | ................ | 717/130 |
| 8,276,124 B2* | 9/2012 | Maennel | ........................ | 717/128 |
| 8,413,121 B2* | 4/2013 | Hinkley et al. | ................ | 717/128 |
| 2005/0091645 A1* | 4/2005 | Chilimbi et al. | .............. | 717/130 |
| 2006/0101416 A1* | 5/2006 | Callahan et al. | ............... | 717/128 |
| 2007/0006174 A1* | 1/2007 | Sohm et al. | .................... | 717/131 |
| 2009/0089759 A1* | 4/2009 | Rajan et al. | .................... | 717/126 |
| 2009/0125887 A1* | 5/2009 | Kahlon et al. | ................. | 717/128 |
| 2009/0259989 A1* | 10/2009 | Cifuentes et al. | ............. | 717/131 |
| 2010/0198799 A1* | 8/2010 | Krishnan et al. | .............. | 717/128 |
| 2010/0281469 A1* | 11/2010 | Wang et al. | .................... | 717/131 |
| 2011/0167412 A1* | 7/2011 | Kahlon et al. | ................. | 717/128 |
| 2012/0233599 A1* | 9/2012 | Valdiviezo Basauri et al. | ............................. | 717/126 |

OTHER PUBLICATIONS

Rosu, Grigore, and Feng Chen, Parametric Trace Slicing and Monitoring, [Online] Technical Report UIUCDCS, Jul. 2008, [Retrieved from the Internet] <https://www.ideals.illinois.edu/bitstream/handle/2142/10873/UIUCDCS-R-2008-2977.pdf> 16 pages.*

(Continued)

*Primary Examiner* — Thuy Dao
*Assistant Examiner* — Ravi K Sinha
(74) *Attorney, Agent, or Firm* — Wolfe-SBMC

(57) ABSTRACT

A program trace is obtained and events of the program trace are traversed. For each event identified in traversing the program trace, a trace slice of which the identified event is a part is identified based on the parameter instance of the identified event. For each trace slice of which the identified event is a part, the identified event is added to an end of a record of the trace slice. These parametric trace slices can be used in a variety of different manners, such as for monitoring, mining, and predicting.

18 Claims, 5 Drawing Sheets

(56) References Cited

OTHER PUBLICATIONS

Chen, Feng, Traian Florin Serbanuta, and Grigore Rosu, jPredictor: A predictive Runtime Analysis Tool for Java, [Online] ICSE'08. ACM/IEEE 30th International Conference on Software Engineering, 2008, [Retrieved from the Internet] <http://ieeexplore.ieee.org/stamp/stamp.jsp?tp=&arnumber=4814133> pp. 221-230.*

Chen, Feng, and Grigore Rosu, Java-MOP: A monitoring oriented programming environment for Java, [Online] Tools and Algorithms for the Construction and Analysis of Systems. Springer Berlin Heidelberg, 2005, [Retrieved from the Internet] <http://link.springer.com/content/pdf/10.1007%2F978-3-540-31980-1_36.pdf> 546-550.*

Field, John; Ganesan Ramalingam; and Frank Tip, Parametric Program Slicing, [Online] 1995, Proceedings of the 22nd ACM SIGPLAN-SIGACT symposium on Principles of programming languages, [Retrieved from the Internet] <http://delivery.acm.org/10.1145/200000/199534/p379-field.pdf> pp. 379-392.*

Cheng, P. S., Trace-driven system modeling, [Online] 1969, IBM Systems Journal, vol. 8, No. 4, [Retrieved from the Internet] <http://ieeexplore.ieee.org/stamp/stamp.jsp?tp=&arnumber=5388334&isnumber=5388331> pp. 280-289.*

Zhai et al., FACT: fast communication trace collection for parallel applications through program slicing, [Online] 2009, In Proceedings of the Conference on High Performance Computing Networking, Storage and Analysis (SC '09), [Retrieved from the Internet] <http://delivery.acm.org/10.1145/1660000/1654087/a27-zhai.pdf> total 12 pages.*

"Apache James Project", retrieved from <<http://james.apache.org/>> on Jan. 19, 2011, (Nov. 15, 2010), 1 page.

"Apache Lucene Project", retrieved from <<http://lucene.apache.org>> on Jan. 19, 2011, (Dec. 3, 2010), 7 pages.

"AspectJ", retrieved from <<http://eclipse.org/aspectj>> on Jan. 18, 2011, (Jun. 29, 2010), 3 pages.

"JavaMOP Experiment Enable Sets", http://fsl.cs.uiuc.edu/index.php/JavaMOP_Experiment_Enable_Sets., (2009), 14 pages.

"JFreeChart", retrieved from <<http://www.jfree.org/jfreechart>> on Jan. 19, 2011, (2005-2009), 3 pages.

"JMiner Webpage", retrieved from <<http://fsl.cs.uiuc.edu/jminer>> on Jan. 19, 2011, (Apr. 15, 2010), 12 pages.

"Scan Website", retrieved from <<http://scan.sourceforge.net>> on Jan. 19, 2011, (2007-2009), 1 page.

"Soot Website", retrieved from <<http://www.sable.mcgill.ca/soot/>> on Jan. 18, 2011, (Mar. 29, 2010), 4 pages.

"Temporal Rover", retrieved from http://www.time-rover.com on Jan. 18, 2011, 1 page.

Acharya, Mithun et al., "Mining API Patterns as Partial Orders from Source Code: From Usage Scenarios to Specifications", ESEC/FSE'07, (Sep. 3-7, 2007), 10 pages.

Allan, et al., "Adding Trace Matching with Free Variables to AspectJ", OOPSLA '05, (Oct. 16-20, 2005), 20 pages.

Ammons, Glenn et al., "Mining Specifications", POPL '02, proceedings of the 29th AMC SIGPLAN-SIGACT symposium on Principles of programming languages, vol. 37, (Jan. 16-18, 2002), pp. 4-16.

Avgustinov, Pavel et al., "Making Trace Monitors Feasible", OOPSLA '07, (Oct. 21-25, 2007), pp. 589-607.

Barringer, Howard et al., "Rule Systems for Run-Time Monitoring: From Eagle to RuleR", RV '07, vol. 4839 of LNCS, (Jan. 26, 2007), pp. 111-125.

Barringer, Howard et al., "Rule-Based Runtime Verification", Verification, Model Checking, and Abstract Interpretation (VM CAI '04, ser. LNCS, vol. 2937, (2004), 14 pages.

Blackburn, Stephen et al., "The DaCapo Benchmarks: Java Benchmarking Development and Analysis", OOPSLA '06, (2006), 22 pages.

Bodden, Eric "J-LO, A Tool for Runtime-Checking Temporal Assertions", Master's Thesis, RWTH Aachen University, (Oct. 13, 2005), 146 pages.

Bodden, Eric et al., "A Staged Static Program Analysis to Improve the Performance of Runtime Monitoring", ECOOP '07, (2007), 25 pages.

Bodden, Eric et al., "Dependent Advice: A General Approach to Optimizing History-based Aspects", AOSD 09 (Mar. 2-6, 2009), pp. 3-14.

Briand, Lionel C., et al., "Toward the Reverse Engineering of UML Sequence Diagrams for Distributed Java Software", IEEE Transactions on Software Engineering, vol. 32, No. 9, (Sep. 2006), 22 pages.

Brzozowski, Janusz A., "Derivatives of Regular Expressions", Journal of the Association for Computing Machinery (JACM), vol. 11, No. 4, (Oct. 1964), pp. 481-494.

Chen, et al., "JPredictor: a Predictive Runtime Analysis Tool for Java", ICSE'08 (May 10-18, 2008), pp. 221-230

Chen, et al., "Parametric and Sliced Causality", Communications of the ACM (CAV)'07, (2007), 13 pages.

Chen, Feng et al., "Efficient Formalism-Independent Monitoring of Parametric Properties", University of Illinois at Urbana-Champaign, Tech Rep. 2142-11787, Available: http://hdl.handle.net/2142/11787, (May 12, 2009), 18 pages.

Chen, Feng et al., "Mining Parametric State-Based Specifications from Executions", Technical Report UIUCDCS-R-2008-3000, Dept. of Computer Science at UIUC, (2008), 11 pages.

Chen, Feng et al., "MOP: An Efficient and Generic Runtime Verification Framework", OOPSLA '07, ACM Press, (Oct. 21-25, 2007), pp. 569-588.

Chen, Feng et al., "Parametric Trace Slicing and Monitoring", TACAS'09, LNCS vol. 5505 (2009), pp. 246-261.

Chen, Feng et al., "Towards Monitoring-Oriented Programming: A Paradigm Combining Specification and Implementation", Electronic Notes in Theoretical Computer Science, vol. 89, No. 2, (2003), 20 pages.

Damm, Werner et al., "LSCs: Breathing Life into Message Sequence Charts", Formal Methods in System Design, vol. 19 No. 1 (2001), pp. 45-80.

Drusinsky, Doron "The Temporal Rover and the ATG Rover", Proceedings of the 7th International SPIN Workshop on SPIN Model Checking And Software VerificationSpringer-Verlag London, UK ©2000, (2000), 9 pages.

Ernst, Michael D., et al., "Quickly Detecting Relevant Program Invariants", ISCE '00, (1999), 10 pages.

Gabel, Mark et al., "Symbolic Mining of Temporal Specifications", ICSE '08, Proceedings of the 30th international conference on Software engineering, (May 10-18, 2008), pp. 51-60.

Goldsmith, Simon et al., "Relational Queries Over Program Traces", OOPLSA '05, Proceedings of the 20th annual ACM SIGPLAN Conference on Object-Oriented Programming, systems, languages, and applications, (Oct. 16-20, 2005), 18 pages.

Hangal, Sudheendra et al., "Tracking Down Software Bugs Using Automatic Anomaly Detection", 24th International Conference on Software Engineering, (May 2002), 11 pages.

Havelund, Klaus et al., "Monitoring Java Programs with Java PathExplorer", Runtime Verification (RV'01), ser ENTCS, vol. 55 No. 2 (May 2001), 20 pages.

Joshi, Pallavi et al., "Predictive Typestate Checking of Multithreaded Java Programs", ASE '08, (Sep. 2008), 9 pages.

Kiczales, Gregor et al., "An Overview of AspectJ", European Conference on Object Oriented Programming (ECOOP) '01, (2001), 28 pages.

Lamport, Leslie "Time, clocks, and the Ordering of Events in a Distributed System", Communications of the ACM, vol. 21, No. 7, (Jul. 1978), pp. 558-565.

Lo, David et al., "Mining Scenario-Based Triggers and Effects", ASE '08, (2008), pp. 109-118.

Lorenzoli, Davide et al., "Automatic Generation of Software Behavioral Models", ICSE '08, (May 10-18, 2008), 10 pages.

Martin, Michael et al., "Finding Application Errors and Security Flaws Using PQL: a Program Query Language", OOPLSA'05, (Oct. 16-20, 2005), pp. 365-383.

Meredith, Patrick O., et al., "Efficient Monitoring of Parametric Context-Free Patterns", ASE '08, IEEE/ACM, (2008), pp. 148-157.

(56) References Cited

OTHER PUBLICATIONS

Moaz, Shahar et al., "From Multi-Modal Scenarios to Code: Compiling LSCs into AspectJ", *SIGSOFT'06/FSE-14, Proceedings of the 14th ACM SIGSOFT international symposium on Foundations of software engineering*, Nov. 5-11, 2006, pp. 219-229.

Raman, Anand et al., "The sk-strings method for inferring PFSA", *International Conference on Machine Learning (ICML)* '97, (1997), 7 pages.

Ramanathan, Murali K., et al., "Path-Sensitive Inference of Function Precedence Protocols", *29th International Conference on Software Engineering (ICSE)* '07, (2007), 10 pages.

Ramanathan, Murali K., et al., "Static Specification Inference Using Predicate Mining", *PLDI* '07, (Jun. 11-13, 2007), 12 pages.

Shoham, Sharon et al., "Static Specification Mining Using Automata-Based Abstractions", *ISSTA* '07, (Jul. 9-12, 2007), 11 pages.

Yang, Jinlin et al., "Perracotta: Mining Temporal API Rules from Imperfect Traces", *ICSE* '06, (May 20-28, 2006), 10 pages.

\* cited by examiner

PARAMETRIC TRACE SLICING

RELATED APPLICATIONS

This application claims the benefit of U.S. Provisional Application No. 61/298,303, filed Jan. 26, 2010, entitled "Parametric Trace Slicing", to Grigore Rosu, Feng Chen, and Patrick O. Meredith, which is hereby incorporated by reference herein.

GOVERNMENT LICENSE

This invention was made with Government support under Grant Numbers CCF-0448501, CNS-0509321, and CNS-0720512 awarded by the National Science Foundation (NSF), and Contract Number NNL08AA23C awarded by the National Aeronautics and Space Administration (NASA). The Government has certain rights in the invention.

BACKGROUND

Analyzing execution traces of programs is oftentimes performed to debug and/or otherwise analyze computer programs. Unfortunately, many computer programs can result in execution traces that are very long and/or complex. This problem is exacerbated for parametric traces, which are traces that contain events with parameter bindings. In parametric traces, the execution trace typically includes multiple trace slices merged together, with each trace slice corresponding to a parameter binding. Accordingly, it can be difficult to analyze execution traces, particularly for parametric traces.

SUMMARY

This Summary is provided to introduce subject matter that is further described below in the Detailed Description. Accordingly, the Summary should not be considered to describe essential features nor used to limit the scope of the claimed subject matter.

In accordance with one or more aspects, a program trace is obtained and events of the program trace are traversed. For each event identified in traversing the program trace, a trace slice of which the identified event is a part is identified based on one or more parameter instances in the identified event. For each trace slice of which the identified event is a part, the identified event is added to an end of a record of the trace slice.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Parametric trace slicing is discussed herein. A program trace is a parametric execution trace containing events with parameter bindings, and is traversed to identify multiple parametric trace slices in the program trace. During the traversal, a table of parametric trace slices is generated. This table can be subsequently accessed to retrieve one or more parametric trace slices without re-traversing the program trace. These parametric trace slices can be used in a variety of different manners, such as for one or more of monitoring, mining, and predicting.

Figure 1:
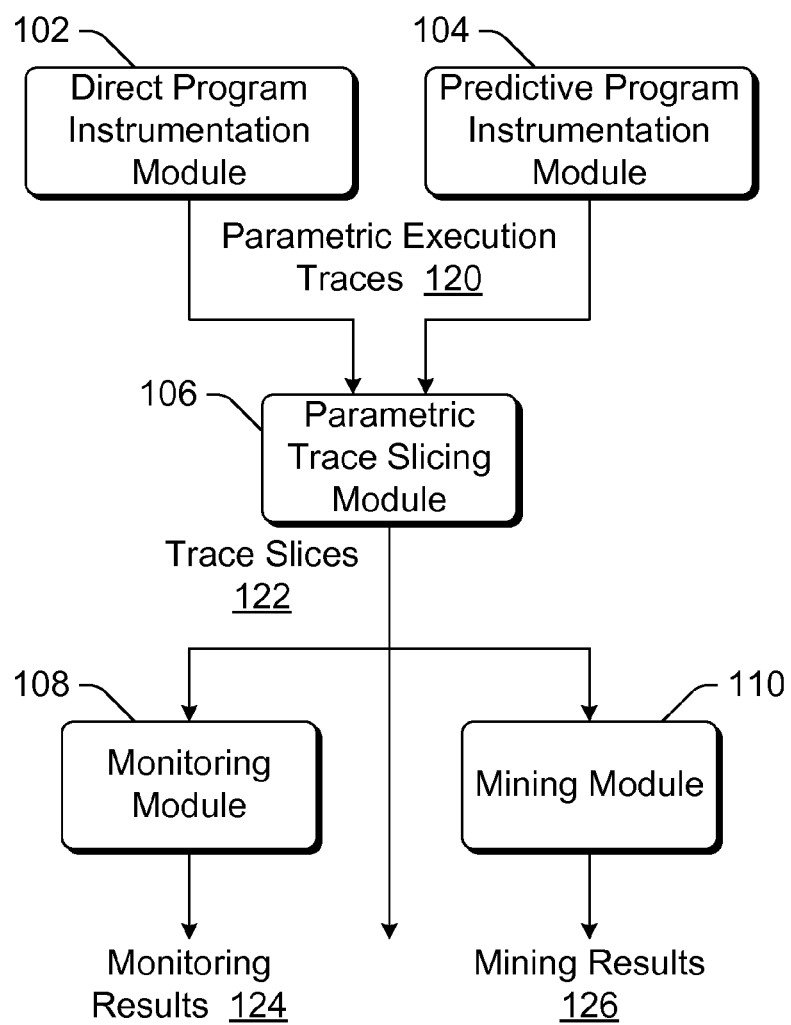
FIG. 1 illustrates an example system employing the parametric trace slicing in accordance with one or more embodiments.

FIG. 1 illustrates an example system 100 employing the parametric trace slicing in accordance with one or more embodiments. System 100 includes a direct program instrumentation module 102, a predictive program instrumentation module 104, a parametric trace slicing module 106, a monitoring module 108, and a mining module 110. Each of modules 102, 104, 106, 108, and 110 can be implemented in software, firmware, and/or hardware. Additionally, each module 102, 104, 106, 108, 110 can be implemented by one or more computing devices. Furthermore, modules 102, 104, 106, 108, and 110 can all be implemented in the same computing device, or alternatively implemented by different computing devices. In embodiments where system 100 is implemented by multiple computing devices, the multiple computing devices can communicate with one another via a variety of different types of communications networks. For example, the computing devices can communicate with one another using a direct wired or wireless coupling of the computing device, the Internet, a local area network (LAN), a public telephone network, a cellular or other wireless phone network, combinations thereof, and so forth.

Parametric execution traces 120 can be generated using a variety of different techniques, such as using direct program instrumentation and/or predictive program instrumentation. In one or more embodiments, parametric execution traces 120 are generated by module 102 using direct program instrumentation. In such embodiments, parametric traces are constructed in the order events occur in the actual program.

In alternate embodiments, parametric execution traces 120 are generated by module 104 using predictive program instrumentation. In such embodiments, multiple parametric execution traces 120 are output by module 104, one of which corresponds to the actual order of observed events in a program. The other parametric execution traces correspond to possible sequences of events with respect to a partial order such as "happens-before" or "sliced causality", and are relevant in multi-threaded or distributed programs. These other parametric execution traces are not the actual observed trace, although these other parametric execution traces may occur in different runs or executions of the program. Thus, using predictive program instrumentation additional bugs or errors can be found that did not occur when the program was actually run.

Parametric trace slicing module 106 receives one or more execution traces 120. Module 106 analyzes parametric execution traces 120 and outputs one or more trace slices 122 obtained from the parametric execution traces 120. In one or more embodiments, trace slices 122 are output by system 100 for analysis (e.g., by a program developer). In addition to (or alternatively in place of) system 100 outputting trace slices 122, trace slices 122 can be input to one or more of monitoring module 108 and mining module 110.

A parametric execution trace 120 is an execution trace that contains events with parameter bindings. Events with parameter bindings are present in programs where abstract parameters (e.g., variable names) are bound to concrete data (e.g., heap objects) at runtime. Accordingly, a parametric execution trace 120 can include numerous events with numerous parameter bindings. Parametric trace slicing module 106 analyzes a parametric execution trace 120 and obtains the trace slices corresponding to each instance of a parameter. Module 106 generates a record (e.g., a table) of parametric trace slices while traversing trace 120, thereby avoiding any need to re-traverse the trace for each instance of a parameter. Module 106 also obtains the trace slices without imposing restrictions on the type of parametric execution trace 120. For example, the first event for a particular property instance need not bind all the parameters for the property.

Monitoring module 108 monitors parametric execution traces and determines whether the monitored traces comply with particular constraints. These constraints can be specified, for example, as regular expressions identifying the format that monitored traces are to follow. Monitoring module 108 can operate on parametric execution traces 120 and/or trace slices 122. An indication of whether traces and/or trace slices comply with the particular constraints can be output by monitoring module 108 in a variety of different manners, such as by generating one or more tables and/or other records. These indications are output by module 108 as monitoring results 124.

Mining module 110 analyzes trace slices 122 to generate non-parametric state-based specifications together with equivalent regular expressions. An indication of these specifications and/or regular expressions are output by module 110 as mining results 126. Mining module 110 automatically detects various aspects regarding the manner in which the underlying program (that was executed to generate parametric execution traces 120) operates. For example, mining module 110 can automatically detect Application Programming Interface (API) patterns, usage scenarios, and so forth.

Direct Program Instrumentation

Direct program instrumentation refers to obtaining a parametric execution trace corresponding to an actual execution of a program. Direct program instrumentation is performed by, for example, direct program instrumentation module 102 of FIG. 1.

Generally, using direct program instrumentation, particular points of interest in a program are specified. The location of these points of interest can be specified in different manners, such as by a user (e.g., a program developer or system administrator), or by another module or device. When such specified points of interest in the program are reached, they are reported as an event to one or more other modules in the system. A set of such events reported for a program are the parametric execution trace for the program. Direct program instrumentation can be performed in a variety of different conventional manners. For example, direct program instrumentation can be performed using an aspect language such as AspectJ. Additional information regarding the AspectJ aspect language can be found in, for example, "An Overview of AspectJ", by G. Kiczales, E. Hilsdale, J. Hugunin, M. Kersten, J. Palm, and W. G. Griswold, European Conference on Object Oriented Programming (ECOOP) '01 (2001).

Predictive Program Instrumentation

Predictive program instrumentation refers to attempting to infer all possible execution traces in a multi-threaded or distributed program in which different inter-leavings of execution of the threads or distributed pieces can result in different execution traces. Predictive program instrumentation is performed by, for example, predictive program instrumentation module 104 of FIG. 1. It should be noted that although inferring all possible execution traces is attempted, the predictive program instrumentation may actually infer fewer than all possible execution traces.

Predictive program instrumentation begins by generating a direct trace of program events (e.g., using direct program instrumentation as discussed above). At predetermined points during the collection of the direct trace, a partial order of events is determined using control relations such as "happens-before" or "sliced causality". The partial order of events can be determined using a variety of different control relations. Additional information regarding the "happens-before" control relation can be found in, for example, "Time, Clocks, and the Ordering of Events in Distributed Systems", by L. Lamport, Communications of the ACM, 21(7):558565 (1978). Additional information regarding the "sliced causality" control relation can be found in, for example, "Parametric and Sliced Causality", by F. Chen and G. Rosu, Computer Aided Verification (CAV) '07 (2007).

The location of these predetermined points can be specified by a user (e.g., a program developer or system administrator), or by another module or device. In one or more embodiments, the location of the predetermined points is determined by balancing precision of the partial orders (which is increased or improved by spacing the predetermined points further apart) against runtime overhead (which is decreased or improved by spacing the predetermined points closer together).

The feasible traces with respect to these determined partial orders of events are generated. For example, assume a program generates a trace a b c, where each letter represents an event, and that the control relation used determines that a must occur before c. In this example, then, the feasible traces b a c and a c b can be inferred. The parametric execution traces generated by the predictive program instrumentation include these feasible traces as well as the actual traces from the direct trace of program events. Thus, the parametric execution trace includes feasible traces that were not actually part of the tested execution of the program. This allows errors that occur within a feasible trace (but do not occur in the actual tested execution of the program) to be identified or predicted. Referring to FIG. 1, this allows the monitoring performed by monitoring module 108 and/or the mining performed by mining module 110 to be performed based on feasible traces that did not occur in the actual tested execution of the program.

Parametric Trace Slicing

Parametric trace slicing refers to obtaining from (or identifying in) a parametric execution trace multiple trace slices each of which corresponds to an instance of a parameter in the parametric execution trace. Parametric execution traces can be obtained using a variety of different instrumentation techniques, such as the direct program instrumentation and/or predictive program instrumentation techniques discussed above. Parametric trace slicing is performed by, for example, parametric trace slicing module 106 of FIG. 1.

In the discussions herein, $\epsilon$ refers to a set of non-parametric events (also referred to as base events). An $\epsilon$-trace is a non-parametric trace when $\epsilon$ is understood or not important. An $\epsilon$-trace is referred to as any finite sequence of events in $\epsilon$, also referred to as an element in $\epsilon^*$. An event can be referred to as e and a trace can be referred to as w, and if an event e∈ϵ appears in a trace w∈ϵ*, this situation is also referred to as e∈w.

An ϵ-property P, also referred to as a base or non-parametric property, is a function P:ϵ*→C that partitions a set of traces into categories C. In one or more embodiments, categories in C include "validating", "violating", and "don't know" (also referred to as "?"). Other categories for C can alternatively be used, such as "matching" and "don't care".

A regular expression can be used to identify an acceptable or proper format for a trace (or portion thereof). This can also be referred to as a constraint on the trace (or portion thereof). Assuming C is the set {validating, violating, don't know}, and for a given regular expression E of a trace, the property $P_E:\epsilon^* \to C$ of the regular expression E is defined as follows: $P_E(w)$=validating if and only if w is in the language of E, $P_E(w)$=violating if and only if there is no w'∈ϵ* such that w w' is in the language of E, and $P_E(w)$=don't know otherwise.

These preceding definitions can be extended to the parametric case where events carry concrete data instantiating abstract parameters as follows. For example, assume an event Acquire and an event Release are parametric in their resource (a resource to be acquired and released). Assume r is the name of the generic resource parameter, and that $r_1$ and $r_2$ are two concrete resources. Following this assumption, parametric acquire/release events have the form Acquire⟨r↦$r_1$⟩, Release⟨r↦$r_2$⟩, and so forth. It should be noted that not all events need carry instances for all parameters. For example, Begin and End parametric events (signifying the beginning and ending, respectively, of a procedure), have the form Begin⟨⊥⟩ and End⟨⊥⟩, where ⊥ refers to the partial map undefined everywhere and instantiates no parameter. The sets of total/partial functions from A to B are also referred to as [A→B]/[A⇁B].

A set of parameters is referred to as X, and a set of corresponding parameter values is referred to as V. A set of base events is referred to as ϵ as discussed above, and ϵ⟨X⟩ is a set of corresponding parametric events e⟨θ⟩ where e is a base event in ϵ and θ is a partial function [X⇁V]. A parametric trace is a trace with events in ϵ⟨X⇁, also referred to as a word in ϵ↦X⟩*.

In the discussions herein, the parameter values set V is implicit to simplify writing. For example, a parametric trace can be: Begin⟨⊥⟩ Acquire⟨$θ_1$⟩ Acquire⟨$θ_2$⟩ Acquire⟨$θ_1$⟩ Release⟨$θ_1$⟩ End⟨⊥⟩ Begin⟨⊥⟩ Acquire⟨$θ_2$⟩ Release⟨$θ_2$⟩ End⟨⊥⟩, where $θ_1$ maps r to $r_1$ and $θ_2$ maps r to $r_2$. Additionally, in the discussions herein just the parameter values are listed when writing parameter instance, such as ⟨$r_1$⇁ instead of ⟨r↦$r_1$⟩, τ↾$r_2$ instead of τ↾r↦$r_2$, and so forth. Using this notation, the previous example parametric trace can be written as: Begin⟨⟩ Acquire⟨r⟩ Acquire⟨$r_2$⟩ Acquire⟨$r_1$⟩ Release⟨$r_1$⟩ End⟨⟩ Begin⟨⟩ Acquire⟨$r_2$⟩ Release⟨$r_2$⟩ End⟨⟩. This example parametric trace thus involves two resources ($r_1$ and $r_2$), and includes two trace slices (one for each of the two resources). The Begin and End events in the parametric trace belong to both trace slices. The trace slice corresponding to $θ_1$ is: Begin Acquire Acquire Release End Begin End. The trace slice corresponding to $θ_2$ is: Begin Acquire End Begin Acquire Release End.

Partial functions θ in [X⇁V] are referred to as parameter instances. The θ and θ'∈[A⇁B] are referred to as being compatible if for any x∈Dom(θ)∩Dom(θ') where θ(x)=θ'(x). Compatible instances θ and θ' can be combined, written as θ⊔θ', as follows:

$$(\theta \sqcup \theta')(x) = \begin{cases} \theta(x) & \text{when } \theta(x) \text{ is defined} \\ \theta'(x) & \text{when } \theta'(x) \text{ is defined} \\ \text{undefined} & \text{otherwise} \end{cases}$$

The θ⊔θ' is also referred to as the least upper bound (lub) of θ and θ'. The θ' is less informative than θ, or θ is more informative than θ', also written as θ'⊑θ if and only if for any x∈X, if θ'(x) is defined then θ(x) is also defined and θ'(x)=θ(x). For example, ⟨⟩ is compatible with ⟨$r_1$⟩ and with ⟨$r_2$⟩, but ⟨$r_1$⟩ and ⟨$r_2$⟩ are not compatible. Additionally, ⟨⟩⊑⟨$r_1$⟩ and ⟨⟩⊑⟨$r_2$⟩.

Given a parametric trace τ∈ϵ⟨X⟩* and θ in [X⇁V], then the θ-trace slice τ↾θ∈ϵ* is the non-parametric trace defined as:

ϵ↾=ϵ, where ϵ is the empty trace/word, and (τe↦θ)↾θ=(τ⇁θ)e when θ'⊈θ, and (τe↦θ↾)↾θ=τ↾θ when θ'⊑θ.

The trace slice τ↾θ first filters out the parametric events that are not relevant for the instance θ. The parametric events that are not relevant for the instance θ are the parametric events that contain instances of parameters that θ does not care about (e.g., instances of parameters not included in θ). For the remaining events relevant to θ, the trace slice τ↾θ forgets or drops the parameters so that the trace can be checked against base, non-parametric properties. It should be noted obtaining such trace slices is different from extracting traces from executions and abstracting traces from executions. Extracting traces refers to determining the events to include in the trace, as well as parameter instances carried by events. Abstracting traces refers to dispatching each event in the given trace to corresponding trace slices according to the event's parameter instance.

A set of parameters together with their corresponding parameter values V is referred to as X, and P:ϵ*→C refers to a non-parametric property as discussed above. The parametric property ΛX·P is defined as the property (over traces ϵ⟨X⟩* and categories [[X⇁V]→C]):

ΛX·P:ϵ⟨X⟩*→[[X⇁]→C]

which is referred to as (ΛX·P)(τ)(θ)=P(τ↾θ) for any τ∈ϵ↦X⟩* and any θ∈[X⇁V]. If X={$x_1$, ..., $x_n$}, then (Λ{$x_1$, ..., $x_n$}·P) can be written as Λ$x_1$, ..., $x_n$·P. Additionally, $P_ϕ$ refers to a pattern or formula ϕ in some particular trace specification formalism, then ΛX·$P_ϕ$ is written as ΛX·ϕ.

Parametric properties ΛX·P over base properties P:ϵ*→C are thus properties taking traces in ϵ↦X⟩* to categories [[X⇁V]→C], in other words to function domains from parameter instances to base property categories. ΛX·P is defined as if many instances of P are observed at the same time on the parametric trace, one property instance for each parameter instance, and each property instance concerned with its events only (dropping the unrelated events).

Generally, to slice parametric traces, a parametric slicing process is used that takes a parametric execution trace incrementally and builds a partial function of finite domain as a lookup table for all slices of the parametric trace. The parameter instances are the index used to lookup slices in the lookup table. The various parametric trace slices in the parametric trace are identified in this lookup table. A trace slice is computed for all combinations of parameter instances observed in parametric trace events in the trace. In order to obtain a particular slice for a particular set of functions instantiating a particular set of parameter values, a most informative set of parameter instances is calculated. This most informative set of parameter instances refers to all the parameter instances used in the particular slice. The lookup table is then accessed to identify the parametric trace slice identified by the most informative set of parameters. Thus, the parametric trace can be processed or traversed one time as the lookup table is being generated. Appropriate data structures are maintained as the lookup table so that parametric trace slices can be subsequently retrieved for any parameter instance without processing or traversing the parametric trace again.

Figure 2:
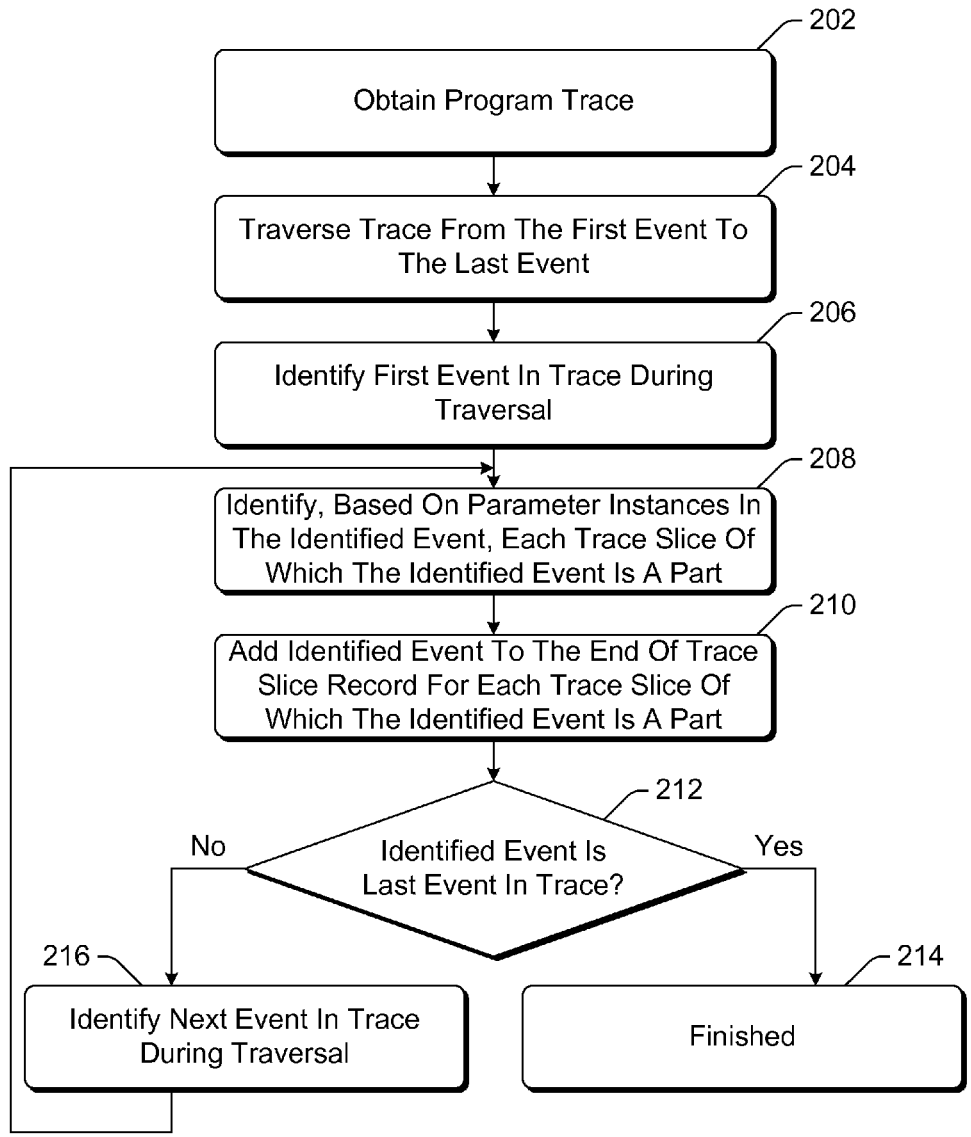
FIG. 2 is a flowchart illustrating an example process for parametric trace slicing in accordance with one or more embodiments.

FIG. 2 is a flowchart illustrating an example process 200 for parametric trace slicing in accordance with one or more embodiments. Process 200 can be implemented in software, firmware, hardware, or combinations thereof. Process 200 is carried out by, for example, a parametric trace slicing module 106 of FIG. 1. Process 200 is shown as a set of acts and is not limited to the order shown for performing the operations of the various acts. Process 200 is an example process for parametric trace slicing; additional discussions of parametric trace slicing are included herein with reference to different figures.

In process 200, a program trace is obtained (act 202). The program trace can be obtained from a variety of different sources in a variety of different conventional manners. The program trace can be a trace of a previously run program, or alternatively an on-going trace of a program currently running The trace is traversed from the first event in the trace to the last event in the trace (act 204). Each event in the trace is analyzed as the trace is traversed. Alternatively, the program trace can be traversed in different orders other than from the first event to the last event.

The first event in the trace is identified during the traversal (act 206). This first event can be a parametric event or a non-parametric event.

Based on the parameter instances in the identified event, each trace slice of which the identified event is a part is identified (act 208). An event is part of a trace slice if the parameter instance of the event is less informative than ($\neg$) the parameter instance of the trace slice. If the event includes no parameter instances, then the event is a part of all trace slices. A record of each different trace slice identified in the trace is maintained. These different trace slices correspond to different possible combinations of parameter instances observed while traversing the trace. A record of each possible trace slice resulting from each possible combination of parameter instances observed in the trace can be maintained regardless of whether the particular combination of parameter instances is actually observed in the trace. Alternatively, a record of each possible trace slice resulting from the combinations of parameter instances actually observed in the trace can be maintained.

The identified event is added to the end of the trace slice record for each trace slice of which the identified event is a part (act 210). For each trace slice identified in act 208, the identified event is added to the end of the record of that trace slice. It should be noted that the identified event can be added with or without its parameter instances.

A check is then made as to whether the identified event is the last event in the trace (act 212). If the identified event is the last event in the trace, then process 200 is finished for the obtained trace (act 214).

However, if the identified event is not the last event in the trace, then the next event in the trace is identified during the traversal (act 216). Process 200 then returns to act 208 to identify, based on the parameter instances in the identified event, each trace slice of which the identified event is a part.

Process 200 illustrates an example process for parametric trace slicing. Example pseudo code for an algorithm performing parametric trace slicing is included in Table I below. The algorithm $A\langle X\rangle$ in Table I takes a parametric trace $\tau \in \epsilon \mapsto X\rangle *$ incrementally and builds a partial function $T \in [[X \neg V] \to \epsilon *]$ of finite domain as a quick lookup table for all slices of $\tau$. Given sets of partial functions $\Theta, \Theta' \subset [X \neg V]$, $\sqcup \Theta$ is the least informative partial function $\theta \in [X \neg V]$ such that for any $\theta' \in \Theta$, $\theta' \neg \theta$; max $\Theta$ is the most informative $\theta \in \Theta$; $\Theta \sqcup \Theta' = \{\theta \sqcup \theta' | \theta \in \Theta, \theta' \in \Theta'$ such that $\theta \sqcup \theta'$ exists$\}$ and $(\theta]_\Theta = \{\theta' | \theta' \in \Theta$ and $\theta' \neg \theta\}$. It should be noted that $\sqcup \Theta$ and max $\Theta$ may not exist. The algorithm $A \mapsto X\rangle$ in Table I takes an input of a parametric trace $\tau \in \epsilon \mapsto X\rangle *$, and outputs a map or lookup table $T \in [[X \neg V] \to \epsilon *]$ and a set $\Theta \subset [X \neg V]$.

TABLE I

| | |
|---|---|
| 1 | $T \leftarrow \bot$; $T(\bot) \leftarrow \epsilon$; $\Theta \leftarrow \{\bot\}$ |
| 2 | for each e($\theta$) in order in $\tau$ do |
| 3 | : for each $\theta' \in \{\theta\} \sqcup \Theta$ do |
| 4 | :: $T(\theta') \leftarrow T(max(\theta']_\Theta)e$ |
| 5 | : end for |
| 6 | : $\Theta \leftarrow \{\bot, \theta\} \sqcup \Theta$ |
| 7 | end for |

The algorithm $A \mapsto X\rangle$ in Table I operates on input $\tau$, also written as $A \mapsto X\rangle(\tau)$, traverses $\tau$ from its first event to its last event and, for each encountered event $e \mapsto \theta\rangle$, updates both its data structures T and $\Theta$. After processing each event, the relationship between T and $\Theta$ is that $\Theta$ is a domain of T.

In the algorithm $A \mapsto X\rangle$ in Table I, at line 1 the data structures T and $\Theta$ are initialized. T is undefined everywhere ($\bot$) except for the undefined everywhere function $\bot$, where $T(\bot) = \epsilon$. $\Theta$ is initialized to the set $\{\bot\}$. The code at lines 3 to 6, inside the outer loop (at lines 2 to 7) is triggered when a new event is received. When a new event $e \mapsto \theta\rangle$ is received, T is updated as follows. For each $\theta'[X \neg V]$ that can be obtained by combining $\theta$ with the compatible partial functions in the domain of the current T, update $T(\theta')$ by adding the non-parametric event e to the end of the slice corresponding to the largest (the most knowledgeable) entry in the current table T that is less informative or as informative as $\theta'$. Then, at line 6, $\Theta$ is extended.

As an example, consider a sample parametric trace with parametric events in $\{a, b, c\}$. The sample parametric trace $\tau = e_1 \mapsto a_1\rangle \ e_2 \mapsto a_2\rangle \ e_3 \mapsto b_1\rangle \ e_4 \mapsto a_2 b_1\rangle \ e_5 \mapsto a_1\rangle \ e_6\langle\rangle \ e_7 \mapsto b_1\rangle$. The following example records illustrate how the algorithm $A \mapsto X\rangle$ works on the sample parametric trace $\tau$. An entry of the form $\mapsto \theta\rangle$:w in a record corresponding to a current parametric event $e \mapsto \theta\rangle$ means that $T(\theta) = w$ after processing all the parametric events up to and including the current parametric event; T is undefined on any other partial function. The $\Theta$ corresponding to a record is the union of all the $\theta$'s that appear in pairs $\mapsto \theta\rangle$:w in that record. It should be noted that as each parametric event $e \mapsto \theta\rangle$ is processed, the non-parametric event e is added at most once to the record of each slice. Tables II-VIII below illustrate the contents of each record for a trace slice after the event identified in each table has been analyzed during traversal of the sample trace.

TABLE II $e_1\langle a_1\rangle$ $\langle\rangle: \epsilon$
$\langle a_1\rangle: e_1$

TABLE III $e_2\langle a_2\rangle$ $\langle\rangle: \epsilon$
$\langle a_1\rangle: e_1$
$\langle a_2\rangle: e_2$

TABLE IV $e_3\langle b_1\rangle$ $\langle\rangle: \epsilon$
$\langle a_1\rangle: e_1$
$\langle a_2\rangle: e_2$
$\langle b_1\rangle: e_3$
$\langle a_1 b_1\rangle: e_1 e_3$
$\langle a_2 b_1\rangle: e_2 e_3$

TABLE V $e_4\langle a_2 b_1\rangle$ $\langle\rangle: \epsilon$
$\langle a_1\rangle: e_1$
$\langle a_2\rangle: e_2$
$\langle b_1\rangle: e_3$
$\langle a_1 b_1\rangle: e_1 e_3$
$\langle a_2 b_1\rangle: e_2 e_3 e_4$

TABLE VI $e_5\langle a_1\rangle$ $\langle\rangle: \epsilon$
$\langle a_1\rangle: e_1 e_5$
$\langle a_2\rangle: e_2$
$\langle b_1\rangle: e_3$
$\langle a_1 b_1\rangle: e_1 e_3 e_5$
$\langle a_2 b_1\rangle: e_2 e_3 e_4$

TABLE VII $e_6\langle\rangle$ $\langle\rangle: e_6$
$\langle a_1\rangle: e_1 e_5 e_6$
$\langle a_2\rangle: e_2 e_6$
$\langle b_1\rangle: e_3 e_6$
$\langle a_1 b_1\rangle: e_1 e_3 e_5 e_6$
$\langle a_2 b_1\rangle: e_2 e_3 e_4 e_6$

TABLE VIII $e_7\langle b_1\rangle$ $\langle\rangle: e_6$
$\langle a_1\rangle: e_1 e_5 e_6$
$\langle a_2\rangle: e_2 e_6$
$\langle b_1\rangle: e_3 e_6 e_7$
$\langle a_1 b_1\rangle: e_1 e_3 e_5 e_6 e_7$
$\langle a_2 b_1\rangle: e_2 e_3 e_4 e_6 e_7$ Parametric Trace Slice Monitoring Trace slice monitoring refers to analyzing the parametric trace slices to verify parametric properties in the execution trace. This monitoring can be used, for example, to assist in the identification of errors or problems in the underlying program (the program whose execution results in the execution trace). Monitoring of the parametric trace slices is performed by a monitoring module, such as module 108 of FIG. 1. The monitoring of the parametric trace slices can be performed as the underlying program is running, or alternatively after the underlying program has run.

For parametric trace slice monitoring, a set of monitors M and a set of parametric monitors $\Lambda X \cdot M$ are defined. Parametric monitors refer to monitors for parametric events and have parameter instance-indexed states and output categories. A parametric monitor $\Lambda X \cdot M$ is a monitor for the property $\Lambda X \cdot P$, with P being the property monitored by M.

A monitor M is a tuple (S, $\epsilon$, C, $\iota$, $\sigma: S \times \epsilon \to S$, $\gamma: S \to C$), where S refers to a set of states, $\epsilon$ refers to a set of input events, C refers to a set of output categories, $\iota \in S$ is the initial state, $\sigma$ is the transition function, and $\gamma$ is the output function. The transition function is extended to $\sigma: S \times \epsilon^* \to S$ in the standard way: $\sigma(s, \epsilon) = s$ and $\sigma(s, we) = \sigma(\sigma(s, w), e)$ for any $s \in S$, $e \in \epsilon$, and $w \in \epsilon^*$. It should be noted, however, that implementations of monitors need not generate all the state space ahead of time, but rather can generate the state space as needed. It should also be noted that, although a finite number of states is reached during any given (finite) execution trace, in general there is no bound on the number of states.

A monitor M=(S, $\epsilon$, C, $\iota$, $\sigma$, $\gamma$) is a monitor for property P:$\epsilon^* \to C$ if and only if $\gamma(\sigma(\iota, w)) = P(w)$ for each $w \in \epsilon^*$. Each monitor M defines the property $P_M: \epsilon^* \to C$ with $P_M(w) = \gamma(\sigma(\iota, w))$. Each such monitor M is referred to as a monitor for $P_M$. Two monitors M and M' are equivalent, referred to as M≡M' and only if $P_M = P_{M'}$.

Given parameters X with corresponding values V, and monitor M=(S, $\epsilon$, C, $\iota$, $\sigma: S \times \epsilon \to S$, $\gamma: S \to C$), the parametric monitor $\Lambda X \cdot M$ is the monitor
$([[X \neg V] \to S], \epsilon \mapsto X\rangle, [[X \neg V] \to C], \lambda \theta \cdot \iota, \Lambda X \cdot \sigma, \Lambda X \cdot \gamma)$
with $\Lambda X \cdot \sigma: [[X \neg V] \to S] \times \epsilon \mapsto X\rangle \to [[X \neg V] \to S]$
and $\Lambda X \cdot \gamma: [[X \neg V] \to S] \to [[X \neg V] \to C]$ defined as, for any $\delta \in [[X \neg V] \to S]$ and any $\theta$, $\theta' \in [X \neg V]$, the following:
  $(\Lambda X \cdot \sigma)(\delta e \mapsto \theta'))(\theta) = \sigma(\delta(\theta), e)$ if $\theta' \neg \theta$, and
  $(\Lambda X \cdot \sigma)(\delta, e \mapsto \theta'))(\theta) = \delta(\theta)$ if $\theta' \not\sqsubseteq \theta$, and
  $(\Lambda X \cdot \gamma)(\delta)(\theta) = \gamma(\delta(\theta))$.

In other words, a state $\delta$ of parametric monitor $\Lambda X \cdot M$ maintains a state $\delta(\theta)$ of M for each parameter instance $\theta$, takes parametric events as input, and outputs categories indexed by parameter instances (one output category of M per parameter instance).

Generally, to monitor parametric trace slices, a monitoring process is used that takes parametric trace slices and builds records of states of monitor instances, and also builds records indicating violation or validation of a property. Similar to the parametric slicing process discussed above, the parametric trace slices can be processed or traversed one time as the records are generated.

Figure 3:
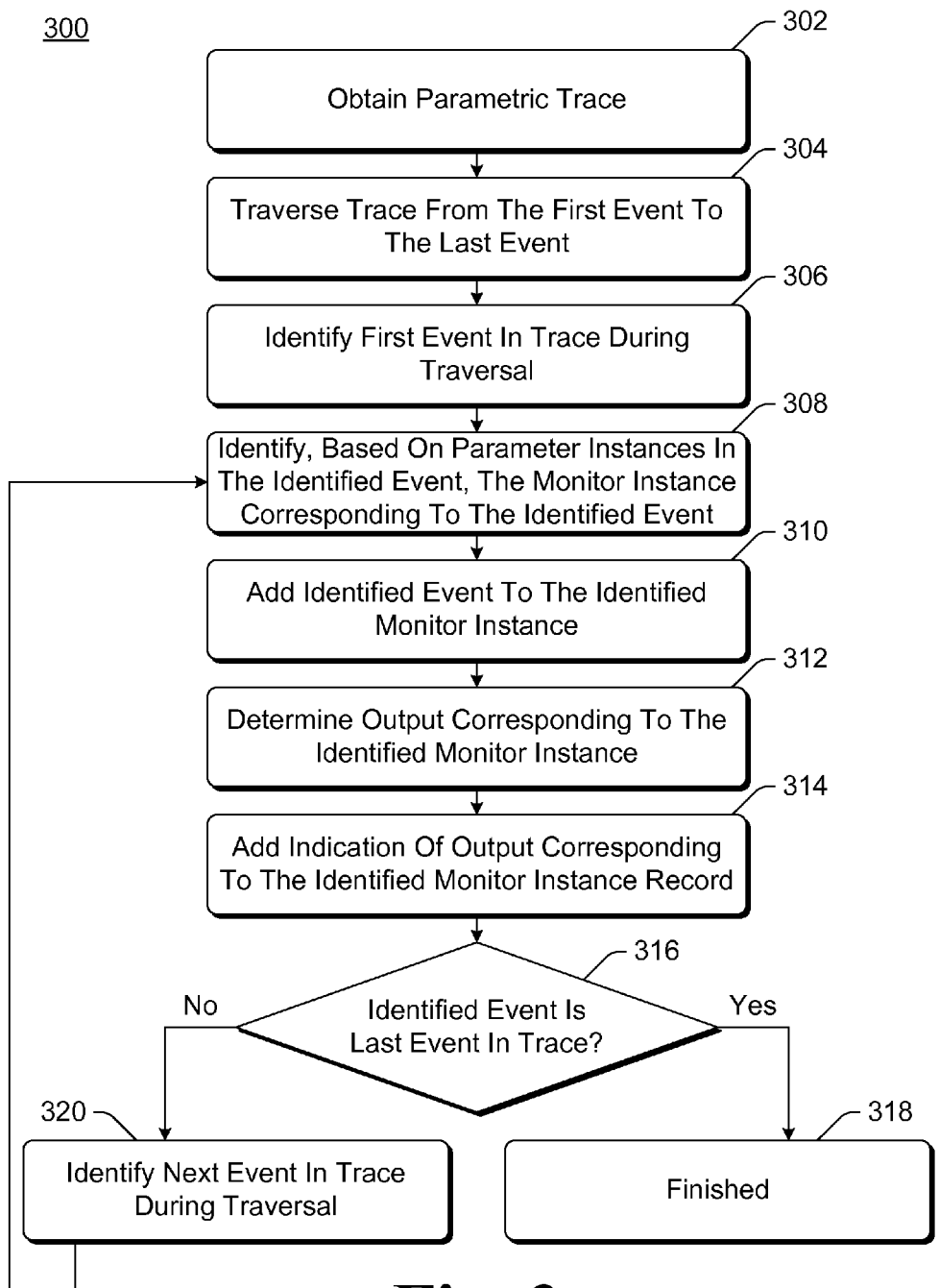
FIG. 3 is a flowchart illustrating an example process for parametric trace slice monitoring in accordance with one or more embodiments.

FIG. 3 is a flowchart illustrating an example process 300 for parametric trace slice monitoring in accordance with one or more embodiments. Process 300 can be implemented in software, firmware, hardware, or combinations thereof. Process 300 is carried out by, for example, a monitoring module 108 of FIG. 1. Process 300 is shown as a set of acts and is not limited to the order shown for performing the operations of the various acts. Process 300 is an example process for parametric trace slice monitoring; additional discussions of parametric trace slice monitoring are included herein with reference to different figures.

In process 300, a program trace is obtained (act 302). The program trace can be obtained from a variety of different sources in a variety of different conventional manners. The program trace can be a trace of a previously run program, or alternatively an on-going trace of a program currently running. Additionally, the program trace can be a parametric trace slice (e.g., generated by slicing module 106 of FIG. 1) rather than an entire program trace (in which case the parameter instance of every event will be _|_).

The trace is traversed from the first event in the trace to the last event in the trace (act 304). Each event in the trace is analyzed as the trace is traversed. Alternatively, the trace can be traversed in different orders other than from the first event to the last event.

The first event in the trace is identified during the traversal (act 306). This first event can be a parametric event or a non-parametric event.

Based on the parameter instances in the identified event, the monitor instance corresponding to the identified event is identified (act 308). An event is part of a trace slice if the parameter instance of the event is less informative than ($\neg$) the parameter instance of the trace slice. A record of each different monitor instance identified in the trace is maintained. These different monitor instances correspond to different possible combinations of parameter instances observed while traversing the trace. A record of each possible monitor instance resulting from each possible combination of parameter instances observed in the trace can be maintained regardless of whether the particular combination of parameter instances is actually observed in the trace. Alternatively, a record of each possible monitor instance resulting from the combinations of parameter instances actually observed in the trace can be maintained.

The identified event is added to the monitor instance record for each monitor instance corresponding to the identified event (act 310). For each monitor instance identified in act 308, the identified event is added to the record of that monitor instance. The identified event can be added to the end of the record, or alternatively elsewhere in the record. It should be noted that the identified event can be added with or without its parameter instances.

An output corresponding to the identified monitor instance is also determined (act 312). The output corresponding to the identified monitor instance, based on the events added to the identified monitor instance thus far, is calculated. This output comprises determining, for example, whether the trace slice corresponding to that monitor instance is validating, violating, or don't know. In other words, whether the trace slice corresponding to that monitor instance complies with the appropriate constraints. This determination is made, for example, based on a regular expression of a trace as discussed above. For example, if a regular expression indicates that an Acquire event is to precede a Release event, then it can be determined that the output corresponding to the identified monitor instance is validating if an Acquire event precedes the Release event in a trace slice (and any other regular expressions for the trace slice are satisfied), but violating if an Acquire event does not precede the Release event.

An indication of the determined output is added to a record corresponding to the identified monitor instance (act 312). For example, an indication of validating, violating, or don't know can be added to the record. Alternatively, indications of validating or violating may be added to the record, but indications of don't know are not added.

A check is then made as to whether the identified event is the last event in the trace (act 316). If the identified event is the last event in the trace, then process 300 is finished for the obtained trace (act 318).

However, if the identified event is not the last event in the trace, then the next event in the trace is identified during the traversal (act 320). Process 300 then returns to act 308 to identify, based on the parameter instances in the identified event, the monitor instance corresponding to the identified event.

Process 300 illustrates an example process for parametric trace slice monitoring. Example pseudo code for an algorithm performing parametric trace slice monitoring is included in Table IX below. The algorithm B$\mapsto$X⟩ in Table IX encodes functions [[X$\neg$V]$\neg$S] as tables with entries indexed by parameters instances in [X$\neg$V] and with content states in S. The algorithm B$\mapsto$X⟩ in Table IX uses a data structure $\Delta$ that is a record of monitor instance states, and a data structure $\Gamma$ that is a record of indications of whether the output corresponding to the monitor instance violates or validates the property (e.g., whether one or more regular expressions for the trace or trace slice is satisfied). In the algorithm B$\mapsto$X⟩ in Table IX, $\Delta$ is mapped to [[X$\neg$V]$\neg$S], and $\Gamma$ is mapped to [[X$\neg$V]$\neg$C].

TABLE IX

| | |
|---|---|
| 1 | $\Delta \leftarrow \bot; \Delta(\bot) \leftarrow \iota; \Theta \leftarrow \{\bot\}$ |
| 2 | for each e⟨ $\theta$ ⟩ in order in $\tau$ do |
| 3 | : for each $\theta' \in \{\theta\} \sqcup \Theta$ do |
| 4 | : : $\Delta(\theta') \leftarrow \sigma(\Delta(\max(\theta']_\Theta),e)$ |
| 5 | : : $\Gamma(\theta') \leftarrow \gamma(\Delta(\theta'))$ |
| 6 | : end for |
| 7 | : $\Theta \leftarrow \{\bot,\theta\} \sqcup \Theta$ |
| 8 | end for |

The algorithm B$\mapsto$X⟩ in Table IX is similar to the algorithm A$\mapsto$X⟩ for which pseudo code is included in Table I discussed above. The algorithm B$\mapsto$X⟩ in Table IX operates on input $\iota$, traverses $\iota$ from its first event to its last event and, for each encountered event e$\mapsto \theta$⟩, updates both its data structures $\Delta$, $\Gamma$, and $\Theta$.

In the algorithm B$\mapsto$X⟩ in Table IX, at line 1 the data structure $\Delta$ is initialized as undefined everywhere ($\bot$) except for the undefined everywhere function $\bot$, $\Delta(\bot)$ is initialized to $\iota$, and $\Theta$ is initialed to the set $\{\bot\}$. The code at lines 3 to 7, inside the outer loop (at lines 2 to 8) is triggered when a new event is received. When a new event e$\mapsto \theta$⟩ is received, at line 4 the state of the monitor instance corresponding to $\theta'$ is calculated and stored in the record $\Delta$ corresponding to $\theta'$ by sending e to the corresponding monitor instance. Additionally, at line 5 a determination is made whether the output corresponding to the monitor instance violates or validates the property, and an indication of the determination is stored in the data structure $\Gamma$. Then, at line 7, $\Theta$ is extended.

In the implementation of algorithm B$\mapsto$X⟩ in Table IX, a search is made (at line 3) for all parameter instances in $\Theta$ that are compatible with θ. Alternatively, an auxiliary data structure can be used to reduce the amount searching that is performed, so that a search for all parameter instances in Θ that are compatible with θ need not be performed. The auxiliary data structure maps each parameter instance θ into the finite set of parameter instances encountered in Δ thus far that are more informative than θ. For example, the auxiliary data structure can be referred to as U, and is defined as U(θ)={θ'|θ'∈ Dom(Δ) and θ⊏ θ'}. Accordingly, the amount of searching that is performed is reduced as only the parameter instances encountered thus far that are more informative than the current parameter instance need be considered.

Example pseudo code for another algorithm performing parametric trace slice monitoring is included in Table X below. The algorithm C↦X⟩ in Table X is similar to the algorithm B↦X⟩ in Table IX, except that the search at line 3 of algorithm B↦X⟩ in Table IX is replaced so that a reduced amount of searching is performed. The algorithm C↦X⟩ in Table X uses the auxiliary data structure U discussed above.

TABLE X

Initialize U(θ) ← { } for any θ ∈ [X¬ V]
Initialize Δ(⊥) ← ι
function main (e⟨ θ⟩)
1 if Δ(θ) undefined then
2 : for each $\theta_{max} \sqsupset \theta$ (in reversed topological order (larger to smaller)) do
3 : : if Δ($\theta_{max}$) defined then
4 : : : go to line 7
5 : : end if
6 : end for
7 : defineTo (θ,$\theta_{max}$)
8 : for each $\theta_{max} \sqsubset \theta$ (in reversed topological order (larger to smaller)) do
9 : : for each $\theta_{comp} \in U(\theta_{max})$ compatible with θ do
10 : : : if Δ($\theta_{comp} \sqcup \theta$) undefined then
11 : : : : defineTo($\theta_{comp} \sqcup \theta,\theta_{comp}$)
12 : : : end if
13 : : end for
14 : end for
15 end if
16 for each θ'∈ {θ} ∪ U(θ) do
17 : Δ (θ') ← σ(Δ(θ'), e)
18 : Γ (θ') ← γ(Δ(θ'))
19 end for
function defineTo(θ,θ')
1 Δ(θ) ← Δ(θ')
2 for each θ'' ⊏ θ do
3 : U(θ'') ← U(θ'') ∪ { θ }
4 end for The algorithm C↦X⟩ in Table X using mappings for Δ and Γ as discussed above with reference to algorithm B↦X⟩ in Table IX, and in addition U is mapped to [X¬ V]→$P_f$ ([[X¬V]]), where $P_f$(S) is the finite power set of set S. The algorithm C↦X⟩ in Table X is composed of two functions: "main" and "defineTo". The "defineTo" function takes two parameter instances, θ and θ', and adds a new entry corresponding to θ into Δ and U. More specifically, the "defineTo" function sets Δ(θ) to Δ(θ') and adds θ into the set U(θ'') for each θ'' ⊏ θ'.

The "main" function differentiates two cases when a new event e↦ e⟩ is received and processed. The first case is that Δ is already defined on θ, in other words θ∈Θ at the beginning of the outer loop (lines 2-8) of the algorithm B↦X⟩ in Table IX. In this first case, {θ}⊔Θ={θ'|θ'∈Θ and θ⊐θ'}⊆Θ, so lines 3 to 6 of the algorithm B↦X⟩ in Table IX become the lines 16 to 19 of the algorithm C↦X⟩ in Table X.

In the second case of the "main" function, when Δ is not already defined on θ, two steps are taken to process e. The first step searches for new parameter instances introduced by {θ}⊔Θ and adds entries for these new parameter instances into Δ (at lines 2 to 15). More specifically, at lines 2 to 7 an entry is added to Δ for θ. A search for all parameter instances $\theta_{comp}$ that are compatible with θ, making use of U (at lines 8 and 9), and for each such $\theta_{comp}$ an appropriate entry is added to Δ for its least upper bound with θ, and U is updated accordingly (at lines 10 to 12). Thus, Δ is defined on the new parameter instances introduced by {θ}⊔Θ after the first step. In the second step, the related monitor states and outputs are updated in a similar way as in the first case (at lines 16 to 19).

Example pseudo code for another algorithm performing parametric trace slice monitoring is included in Table XI below, and is referred to as algorithm C⁺↦X⟩. Algorithm C⁺↦X⟩ in Table XI is similar to algorithm C↦X⟩ in Table X, but extends algorithm C↦X⟩ in Table X to include creation events. Creation events refer to events that lead to creation of new monitor states. The algorithm C↦X⟩ in Table X can be viewed as a special case of the algorithm C⁺↦X⟩ in Table XI in which all events are creation events. The creation events typically occur as a result of a request (e.g., a user request or a request from another component or module) to begin monitoring—each new event encountered after the request to begin monitoring is a creation event. The algorithm C⁺↦X⟩ in Table XI uses the data structure Δ that is a record of monitor instance states, the data structure Γ that is a record of indications of whether the output corresponding to the monitor instance violates or validates the property, and the auxiliary data structure U discussed above.

The algorithm C⁺↦X⟩ in Table XI includes an additional function "defineNew" that takes a parameter instance θ and adds a new entry corresponding to θ into Δ and U.

TABLE XI

Initialize U(θ) ← { } for any θ ∈ [X¬ V]
function main (e⟨ θ⟩)
1 if Δ(θ) undefined then
2 : for each $\theta_{max} \sqsupset \theta$ (in reversed topological order (larger to smaller)) do
3 : : if Δ($\theta_{max}$) defined then
4 : : : go to line 7
5 : : end if
6 : end for
7 : if Δ($\theta_{max}$) defined then defineTo (θ,$\theta_{max}$)
8 : else if e is a creation event then defineNew(θ)
9 end if
10 : for each $\theta_{max} \sqsubset \theta$ (in reversed topological order (larger to smaller)) do
11 : : for each $\theta_{comp} \in U(\theta_{max})$ compatible with θ do
12 : : : if Δ($\theta_{comp} \sqcup \theta$) undefined then
13 : : : : defineTo($\theta_{comp} \sqcup \theta,\theta_{comp}$)
14 : : : end if
15 : : end for
16 : end for
17 end if
18 for each θ'∈ {θ} ∪ U(θ) do
19 : Δ (θ') ← σ(Δ(θ'), e)
20 : Γ (θ') ← γ(Δ(θ'))
21 end for
function defineTo(θ,θ')
1 Δ(θ) ← Δ(θ')
2 for each θ'' ⊏ θ do
3 : U(θ'') ← U(θ'') ∪ {θ}
4 end for
function defineNew(θ)
1 Δ(θ) ← ι
2 for each θ'' ⊏ θ do
3 : U(θ'') ← U(θ'') ∪ {θ}
4 end for Parametric Trace Slice Mining Parametric trace slice mining refers to generating specifications for the underlying program based on the parametric trace slices obtained from an execution trace. The specifications identify various aspects regarding the manner in which the underlying program, such as API patterns, usage scenarios, and so forth. In addition to generating the specifications, regular expressions equivalent to the specifications can also be generated.

Figure 4:
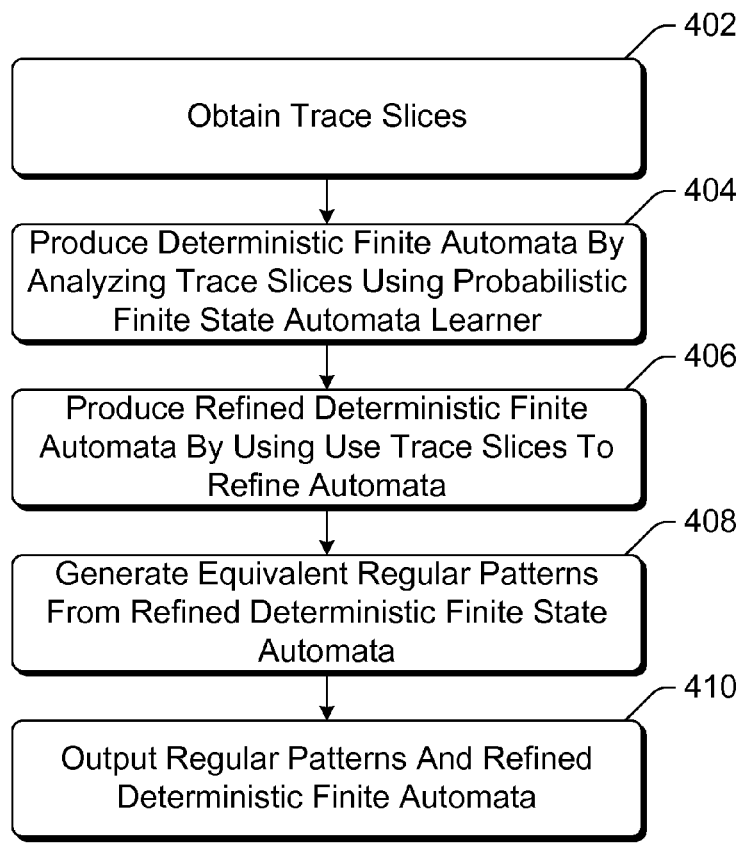
FIG. 4 is a flowchart illustrating an example process for parametric trace slice mining in accordance with one or more embodiments.

FIG. 4 is a flowchart illustrating an example process 400 for parametric trace slice mining in accordance with one or more embodiments. Process 400 can be implemented in software, firmware, hardware, or combinations thereof. Process 400 is carried out by, for example, a mining module 110 of FIG. 1. Process 400 is shown as a set of acts and is not limited to the order shown for performing the operations of the various acts. Process 400 is an example process for parametric trace slice mining; additional discussions of parametric trace slice mining are included herein with reference to different figures.

In process 400, trace slices are obtained (act 402). These trace slices are parametric trace slices as discussed above. It should be noted that although these trace slices are referred to as parametric trace slices, in one or more embodiments they do not include parameters. As discussed above, events are added to trace slices during the parametric trace slicing process, but these different slices correspond to particular combinations of parameters. Thus, the parameters for these events need not recorded in the different slices as the events are associated with particular combinations of parameters by virtue of their being included in a particular trace slice.

Deterministic finite automata are produced based on the obtained trace slices (act 404). A deterministic finite automaton (DFA) is a finite state machine in which for each pair of state and input, there is a single transition to a next state. These deterministic finite automata are generated using a probabilistic finite state automata (PFSA) learner.

Refined deterministic automata are produced based on the use trace slices (act 406). Generally, the refined deterministic finite automata refines the deterministic finite automata produced in act 404 by expanding the deterministic finite automata produced in act 404 to split each state according to its incoming edges (e.g., one state per incoming edge). The expanded deterministic finite automata is then traversed using the obtained trace slices and edges in the expanded deterministic finite automata that are not used in any of the obtained trace slices are removed. The resulting deterministic finite automata is compressed by merging states having the same outgoing transitions and removing those states have no incoming transitions to produce the refined deterministic finite automata.

Equivalent regular patterns are generated from the refined deterministic finite automata (act 408). These regular patterns are generated using a regular pattern generator that generates equivalent regular patterns from finite state machines.

The regular patterns generated in act 408 and the refined deterministic finite automata produced in act 406 are output (act 410). One or more deterministic finite automata are generated for each trace slice obtained in act 402 and output in act 410 as the specification for the trace slice. Alternatively, both the regular patterns and refined deterministic finite automata are not output in act 410 (e.g., only one of the regular patterns and refined deterministic finite automata may be output).

The following describes an example implementation of parametric trace slice mining. The trace slices are input to a probabilistic finite state automata learner, the output automata are input to an automata refiner. The automata refiner refines the automata, generating the finite state machines that are the specifications for the trace slices. These finite state machines are also input to a regular pattern generator, which generates equivalent regular patterns from the finite state machines.

The probabilistic finite state automata learner infers a finite state machine (automaton) from a set of strings, which are the trace slices discussed above. The inferred state machine accepts at least the input trace slices and may allow more as oftentimes the probabilistic finite state automata learner generalizes during its learning process. A variety of different well-known probabilistic finite state automata learners can be used with the parametric trace slice mining discussed herein. In one or more embodiments, the probabilistic finite state automata learner is the well-known sk-string algorithm. Additional information regarding the sk-string algorithm can be found in, for example, "The sk-strings method for inferring pfsa", by A. V. Raman and J. D. Patrick, International Conference on Machine Learning (ICML) '97 (1997).

Generally, the sk-string PFSA learner first constructs a prefix tree, which is essentially a finite state automaton that accepts precisely the input set of strings. Each arc of the prefix tree is labeled with a frequency that represents how many times the arc was traversed during the creation of the tree. The sk-string algorithm is then used to merge states in the prefix tree to build a more compact and more general nondeterministic finite automaton.

State merging is based on a concept referred to as "sk-equivalence". In sk-equivalence, $\Sigma$ refers to the set of words used in the strings, Q refers to the set of states in the prefix tree, $\delta: Q \times \Sigma^* \rightarrow 2^Q$ refers to the transition function, and $F_D$ refers to the set of final states. The set of k-strings of state q is then defined as the set $\{z | z \in \Sigma^*, |z|=k \wedge \delta(q,z) \subset Q \vee |z|<k \wedge \delta(q,z \cap F_D \neq \{\})\}$. Each k-string has a probability associated with it that is the product of the probabilities of the arcs traversed in generating the string. Two states are considered mergeable if the sets consisting of the top s percent of their distribution of k-string are the same (that is, sk-equivalence). This is computed as follows: the k-strings of a state are arranged in decreasing order of their probabilities. The top n strings, whose probabilities add up to s percent or more with n being as small as possible, are retained and the remaining strings (those having lower probabilities) are ignored. Two states are sk-equivalent if the sets of the top n strings of both are the same. The process of merging states is repeated until no more states are sk-equivalent. This way, the algorithm infers a nondeterministic finite automaton accepting a superset of the input strings. This nondeterministic finite automaton is then converted into a deterministic finite automaton.

Thus, the probabilistic finite state automata learner outputs deterministic finite automata, each automaton having nodes that represent the involved components and edges are labeled with events.

The deterministic finite automata output by the probabilistic finite state automata learner can be over-generalized. To compensate for such over-generalization, the automata refiner refines the deterministic finite automata output by the probabilistic finite state automata learner using the trace slices.

Example pseudo code for an algorithm performing parametric trace slice mining is included in Table XII below, and is referred to as algorithm R. An automaton refers to a tuple $(S, \epsilon, i, \delta, F)$, where S refers to a set of states, $\epsilon$ refers to a set of events, $i \in S$ is the initial state, $\delta:[S \times \epsilon \neg S]$ is the transition function, and $F \in S$ is the set of final states. Algorithm R includes a function "main" and a function "expand". The "main" function of algorithm R takes as an input an automaton $A=(S, \epsilon, i, \delta:[S \times \epsilon \neg S], F)$ and a set of trace slices $T \subset \epsilon^*$, and outputs an automaton $A_r$. The "main" function of algorithm R uses local values of automaton $A'=(S', \epsilon, i', \delta', F')$, state s, s', and transition function $\delta_r$. The "expand" function of algorithm R takes as an input an automaton $A=(S, \epsilon, i, \delta, F)$ and outputs an automaton A'=(S', ∈, i', δ', F'). The "expand" function of algorithm R is initialized by setting S' to { }, setting F' to { }, and setting δ' to ⊥. The "expand" function of algorithm R also use local values of integer n, set of states D, and map β:S→$2^{S'}$.

TABLE XII

|   | Function main ( ) |
|---|---|
| 1 | A' ← Expand(A) |
| 2 | $δ_r$ ← ⊥ |
| 3 | for each τ ∈ T do |
| 4 | : s ← i' |
| 5 | : for each e ∈ τ do |
| 6 | : : s' ← s |
| 7 | : : s ← δ'(s,e) |
| 8 | : : $δ_r$(s',e) ← s |
| 9 | : : if $δ_r$=δ' then |
| 10 | : : : go to line 14 |
| 11 | : : end if |
| 12 | : end for |
| 13 | end for |
| 14 | A' ← (S', ∈, i', $δ_r$, F') |
| 15 | $A_r$ ← MergeIdenticalStates(A') |
|   | Function Expand |
| 1 | for each s ∈ S do |
| 2 | : n ← CountIncomingEdges(s,A) |
| 3 | : if s=i then |
| 4 | : : n ← n+1 |
| 5 | : end if |
| 6 | : D ← GetFreshStates(n) |
| 7 | : S' ← D ∪ S' |
| 8 | : β(s) ← D |
| 9 | end for |
| 10 | for each s ∈ S do |
| 11 | : for each s'≠∈ S such that δ(s',e)=s for some e do |
| 12 | : : s'' ← PickOneWithNoIncomingEdge(β(s),δ') |
| 13 | : : for each s''' ∈ β(s') do |
| 14 | : : : δ'(s''',e)=s'' |
| 15 | : : end for |
| 16 | : end for |
| 17 | : if s ∈ F then |
| 18 | : : F' ← F'∪ β(s) |
| 19 | : end if |
| 20 | if s=I then |
| 21 | : : i' ← PickOneWithNoIncomingEdge(β(s),δ') |
| 22 | : end if |
| 23 | end for |
| 24 | return A' |

In algorithm R, the input automaton is expanded using the "expand" function, which splits each state according to its incoming edges. The incoming edges are counted as follows: if δ(s, e)=s' for some s≠s', then e represents an incoming edge to s'. Additionally, it is assumed that the initial state has a default incoming edge (at lines 3 to 5 in the "expand" function). If state s has n incoming edges then n new states are generated for the new automaton and the mapping from s to the corresponding set of newly created states is kept in β (at lines 6 to 8 in the "expand" function). The "expand" function then builds transitions in the new automaton (at lines 10 to 23) as follows. If δ(s', e)=s is a transition in the input automaton and s≠s' then a state s'' from β(s) with no incoming edges yet is chosen and transitions are added from every state in β(s') to s''. If s is a final state then all states in β(s) are also final; if s is the initial state then a state from β(s) with no incoming edges is chosen as the new initial state. Thus, the input automaton is expanded to an equivalent automaton in which every state has a set of incoming edges corresponding to one incoming edge in the original automaton.

The algorithm R then traverses the expanded automaton using the input set of trace slices and marks the transitions used in the traversal (at lines 3 to 13 of the "main" function). After all the traces are applied, the unmarked transitions (which are not traversed in the trace slice) are removed from the expanded automaton to generate a reduced automaton. The reduced automaton is then compressed by merging states that have the same outgoing transitions and removing those states that have no incoming states. At the end, the compressed automaton is associated with parameter information (the combination of parameters associated with the trace slice being analyzed) removed when performing the parametric trace slicing discussed above. The output of the algorithm R is the finite state machines that are the specifications for the trace slices.

The output of the algorithm R can also be input to a regular pattern generator that generates equivalent regular patterns form the finite state machines. A variety of different well-known regular pattern generators can be used with the parametric trace slice mining discussed herein. In one or more embodiments, the regular pattern generator uses the well-known Brzozowski method. Additional information regarding the Brzozowski method can be found in, for example, "Derivatives of regular expressions", by J. A. Brzozowski, Journal of the Association for Computing Machinery (ACM), 11(4):481-494 (1964).

Example Computing Device

Figure 5:
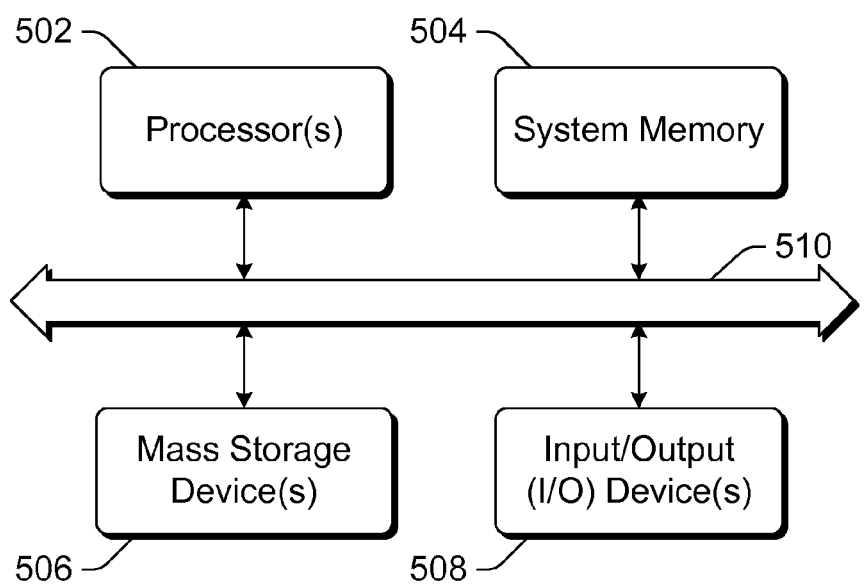
FIG. 5 is a block diagram illustrating an example computing device in which the parametric trace slicing can be implemented in accordance with one or more embodiments.

FIG. 5 is a block diagram illustrating an example computing device 500 in which the parametric trace slicing can be implemented in accordance with one or more embodiments. Computing device 500 can be used to implement the various techniques and processes discussed herein. Computing device 500 can be any of a wide variety of computing devices, such as a desktop computer, a server computer, a handheld computer, a laptop or netbook computer, a personal digital assistant (PDA), an internet appliance, a game console, a set-top box, a cellular phone, a digital camera, audio and/or video players, audio and/or video recorders, and so forth.

Computing device 500 includes one or more processor(s) 502, computer readable media such as system memory 504 and mass storage device(s) 506, input/output (I/O) device(s) 508, and bus 510. Processor(s) 502 include one or more processors or controllers that execute instructions stored in system memory 504 and/or mass storage device(s) 506. Processor(s) 502 may also include computer readable media, such as cache memory.

System memory 504 includes various computer readable media, including volatile memory (such as random access memory (RAM)) and/or nonvolatile memory (such as read only memory (ROM)). System memory 504 may include rewritable ROM, such as Flash memory.

Mass storage device(s) 506 include various computer readable media, such as magnetic disks, optical discs, solid state memory (e.g., Flash memory), and so forth. Various drives may also be included in mass storage device(s) 506 to enable reading from and/or writing to the various computer readable media. Mass storage device(s) 506 include removable media and/or nonremovable media.

I/O device(s) 508 include various devices that allow data and/or other information to be input to and/or output from computing device 500. Examples of I/O device(s) 508 include cursor control devices, keypads, microphones, monitors or other displays, speakers, printers, network interface cards, modems, lenses, CCDs or other image capture devices, and so forth.

Bus 510 allows processor(s) 502, system 504, mass storage device(s) 506, and I/O device(s) 508 to communicate with one another. Bus 510 can be one or more of multiple types of buses, such as a system bus, PCI bus, IEEE 1394 bus, USB bus, and so forth.

Although the description above uses language that is specific to structural features and/or methodological acts in processes, it is to be understood that the subject matter defined in the appended claims is not limited to the specific features or processes described. Rather, the specific features and processes are disclosed as example forms of implementing the claims. Various modifications, changes, and variations apparent to those skilled in the art may be made in the arrangement, operation, and details of the disclosed embodiments herein.

What is claimed is:

1. A method implemented in one or more computing devices, the method comprising:
   obtaining a program trace of a program, the program trace having been generated using predictive program instrumentation and including one or more feasible traces that were not part of a program execution from which the program trace is generated, the one or more feasible traces having been generated based on partial orders of events determined at each of multiple predetermined points during collection of a direct trace of the program;
   traversing events of the program trace;
   identifying, for each event identified in traversing the program trace, a trace slice of which the identified event is a part based on one or more parameter instances in the identified event;
   adding, for each trace slice of which the identified event is a part, the identified event to an end of a record of the trace slice;
   obtaining one or more trace slices obtained from the program trace;
   generating a specification for each of the one or more trace slices, each specification comprising a finite state machine indicating a manner in which the program operates; and
   outputting the specification for each of the one or more trace slices.

2. A method as recited in claim 1, wherein the program trace is a program trace of a program running while the method is being performed.

3. A method as recited in claim 1, wherein an event having no parameter instances is part of all trace slices.

4. A method as recited in claim 1, further comprising maintaining a record of trace slices for each possible combination of parameter instances in the program trace, the possible combination of parameter instances being identified based on the parameter instances observed while traversing the program trace.

5. A method as recited in claim 1, wherein traversing the events of the program trace comprises traversing the program trace from a first event of the program trace towards a last event of the program trace.

6. A method as recited in claim 1, wherein traversing the program trace comprises traversing the program trace one time regardless of the number of parametric trace slices that are obtained from the program trace.

7. A method as recited in claim 1, further comprising:
   determining, for at least part of the program trace, whether a set of constraints for the program trace is complied with; and
   outputting an indication of whether the set of constraints for the program trace is complied with.

8. A method as recited in claim 1, further comprising monitoring the program trace by:
   maintaining a record of monitor instance states, wherein each monitor instance state indicates, for a particular set of parameter instances, a set of identified events; and
   maintaining a record of whether each monitor instance state complies with one or more constraints on the program trace.

9. A method as recited in claim 1, further comprising:
   generating, for each specification, a regular expression equivalent to the specification; and
   outputting the regular expression for each of the one or more trace slices.

10. One or more computer readable memories or non-transitory storage devices having stored thereon multiple instructions execution of which, by one or more processors of a device, causes the one or more processors to:
    obtain a program trace of a program, the program trace having been generated using predictive program instrumentation and including one or more feasible traces that were not part of a program execution from which the program trace is generated, the one or more feasible traces having been generated based on partial orders of events determined at each of multiple predetermined points during collection of a direct trace of the program;
    traverse events of the program trace;
    identify, for each event identified in traversing the program trace, a trace slice of which the identified event is a part based on one or more parameter instances in the identified event;
    add, for each trace slice of which the identified event is a part, the identified event to an end of a record of the trace slice;
    obtain one or more trace slices obtained from the program trace;
    generate a specification for each of the one or more trace slices, each specification comprising a finite state machine indicating a manner in which the program operates; and
    output the specification for each of the one or more trace slices.

11. One or more computer readable memories or non-transitory storage devices as recited in claim 10, the multiple instructions further causing the one or more processors to maintain a record of trace slices for each possible combination of parameter instances in the program trace, the possible combination of parameter instances being identified based on the parameter instances observed while traversing the program trace.

12. One or more computer readable memories or non-transitory storage devices as recited in claim 10, wherein to traverse the events of the program trace is to traverse the program trace from a first event of the program trace towards a last event of the program trace.

13. One or more computer readable memories or non-transitory storage devices as recited in claim 10, wherein to traverse the program trace is to traverse the program trace one time regardless of the number of parametric trace slices that are obtained from the program trace.

14. One or more computer readable memories or non-transitory storage devices as recited in claim 10, the multiple instructions further causing the one or more processors to:
    determine, for at least part of the program trace, whether a set of constraints for the program trace is complied with; and
    output an indication of whether the set of constraints for the program trace is complied with.

15. One or more computer readable memories or non-transitory storage devices as recited in claim 10, the multiple instructions further causing the one or more processors to monitor the program trace by:

maintaining a record of monitor instance states, wherein each monitor instance state indicates, for a particular set of parameter instances, a set of identified events; and maintaining a record of whether each monitor instance state complies with one or more constraints on the program trace.

16. One or more computer readable memories or non-transitory storage devices as recited in claim 10, the multiple instructions further causing the one or more processors to:

generate, for each specification, a regular expression equivalent to the specification; and output the regular expression for each of the one or more trace slices.

17. A computing device comprising:

a processor; and one or more computer readable non-transitory media, coupled to the processor, to store multiple instructions execution of which by the processor causes the processor to:

obtain a program trace of a program, the program trace having been generated using predictive program instrumentation and including one or more feasible traces that were not part of a program execution from which the program trace is generated, the one or more feasible traces having been generated based on partial orders of events determined at each of multiple predetermined points during collection of a direct trace of the program, traverse events of the program trace, identify, for each event identified in traversing the program trace, a trace slice of which the identified event is a part based on one or more parameter instances in the identified event, add, for each trace slice of which the identified event is a part, the identified event to an end of a record of the trace slice, obtain one or more trace slices obtained from the program trace, generate a specification for each of the one or more trace slices, each specification comprising a finite state machine indicating a manner in which the program operates, and output the specification for each of the one or more trace slices.

18. A method as recited in claim 1, wherein the direct trace of the program is a trace corresponding to an actual execution of the program.

* * * * *